United States Patent [19]

Mägerle

[11] 4,152,566
[45] May 1, 1979

[54] APPARATUS FOR MANUFACTURING AN ARTICLE

[76] Inventor: Karl Mägerle, Im vorderen Erb 1, 8700 Kusnacht, Switzerland

[21] Appl. No.: 840,717

[22] Filed: Oct. 11, 1977

[30] Foreign Application Priority Data

Oct. 13, 1976 [CH] Switzerland .................. 12929/76

[51] Int. Cl.² .................. H05B 5/08; B21C 37/06
[52] U.S. Cl. .................. 219/10.53; 29/564.1; 29/792; 156/380; 156/556; 219/10.73; 219/10.69; 228/6 R; 228/47
[58] Field of Search .............. 219/10.53, 10.67, 10.69, 219/10.73, 10.49, 159, 160; 156/272, 380, 556, 559, 362; 269/57, 63, 321 W; 228/47, 6 R, 26, 25; 29/792, 430, 563, 38 R, 564, 564.1, 33 J, 33 K

[56] References Cited

U.S. PATENT DOCUMENTS

| | | | |
|---|---|---|---|
| 2,903,041 | 9/1959 | Jones et al. | 156/380 |
| 3,247,355 | 4/1966 | Olsen | 228/47 |
| 3,991,294 | 11/1976 | Evans | 219/10.53 |

Primary Examiner—Bruce A. Reynolds
Attorney, Agent, or Firm—Cushman, Darby & Cushman

[57] ABSTRACT

A rotary conveyor for moving work pieces mounted on a mandril through a plurality of work stations is provided where the manufacturing steps at each work station require different time intervals to carry out; to reduce the dwell time of the rotary table, the work tool requiring the longest dwell period is mounted directly on the table at each mandril position so as to be movable through all of the work stations with each work piece; a cam surface and cam follower arrangement are provided for moving the work tool into and out of the working position at selected work stations.

13 Claims, 4 Drawing Figures

APPARATUS FOR MANUFACTURING AN ARTICLE

BACKGROUND AND BRIEF DESCRIPTION OF THE INVENTION

The present invention relates to apparatus for the production of articles, for example, tubular containers where a rotary work table moves a shaping mandril or mandrils through a plurality of work stations where the forming steps are sequentially carried out during dwell periods in the work table's rotation. The present invention has for its chief object the shortening of the dwell periods of the work table to the shortest possible time to thereby increase the productive capacity of the equipment.

In known arrangements for the production of articles such as tubular containers, a rotary table which carries a plurality of support elements such as a plurality of mandrils is indexed to move the mandrils through a plurality of work stations. At each work station a forming or assembly tool is located which is timed to move into a working position after the rotary table is indexed to bring a new mandril carrying a work piece to the work station. The rotary table is then put in a dwell mode while the tools at the various stations perform their manufacturing steps in the predetermined sequence.

It has long been known that the dwell period or cycle time for the operating or manufacturing steps must be selected to take into account the particular operating step which requires the greatest time expenditure. As an example, where welding is effected at one of the stations, sufficient dwell time must be provided to allow the work piece to cool sufficiently prior to indexing or moving the table to shift the work pieces to the subsequent manufacturing step. Where the work pieces consist of plastic materials that tend to stick when heated, the cooling step has, in some circumstances, resulted in considerable slowdown of the work table resulting in an undesirable increase in the manufacturing costs.

According to the present invention, an improved apparatus is provided where the dwell time of the rotary conveyor is substantially reduced thus increasing the productive capacity of the apparatus.

This object is attained by mounting at each position of the rotary conveyor at least some of the elements of the tool members that require the greatest time expenditure so that these tool members can be moved with the particular work piece through several work stations of the conveyor and mounting devices are employed to carry these tool members so that they will be out of the area of operation of the remaining tools of the sequence when the rotary conveyor moves through other work stations of the manufacturing process.

With this arrangement, an extended number of manufacturing steps may be distributed over several work positions or stations through which the rotary conveyor moves whereby the dwell or cadence time may be set to correspond to the dwell time needed for the shorter operating steps.

According to a preferred embodiment, a plurality of forming mandrils are mounted on a rotary table which rotates about an axis to move the mandrils through a plurality of work stations. The manufacturing process commences with the mounting of, for example, one element of a container on a mandril which is then moved to a second work station where the mandril receives another component of the container. At a third work station a forming step is employed to pre-shape the elements, while at a fourth work station, a mold member and a welding mechanism are connected to the joined containers to effect sealing thereof. At a fifth work station cooling of the welded joint is permitted, while at a sixth work station, the mold member is removed. At a seventh work station a container closure is attached to the thus formed container, while at an eighth and final station, the container is removed from the rotary conveyor. Since the welding and cooling steps take a longer time than the prior and succeeding manufacturing steps, according to the present invention, in several manufacturing applications, elements of the mold member and welding tool may be permanently mounted adjacent each mandril of the rotary conveyor so as to be pivotable from a non-working to an operating or working position. To effect this movement, a cam disc is fixed about the axis of the table and the welding tool which may include the mold and a high frequency coil is mounted on arms which are pivotably secured to the table adjacent each mandril and a cam follower is attached to the pivoting arms whereby rotation of the table through the selected work stations will effect movement of the welding tool adjacent each mandril at a selected station into an operating position and then at a subsequent work station out of the operating position to permit subsequent tools at other stations to perform their operations without interference from the welding tool.

In the description that follows, a specific example of a tubular container such as is commonly used for toothpaste, cosmetics, medicines, or the like, is given but it will be understood that other types of manufacturing processes can usefully employ the principles of the present invention.

Further advantages and applications of the present invention will become apparent as consideration is given to the following detailed description, taken in conjunction with the accompanying drawings, in which:

DETAILED DESCRIPTION OF THE INVENTION

Figure 1:
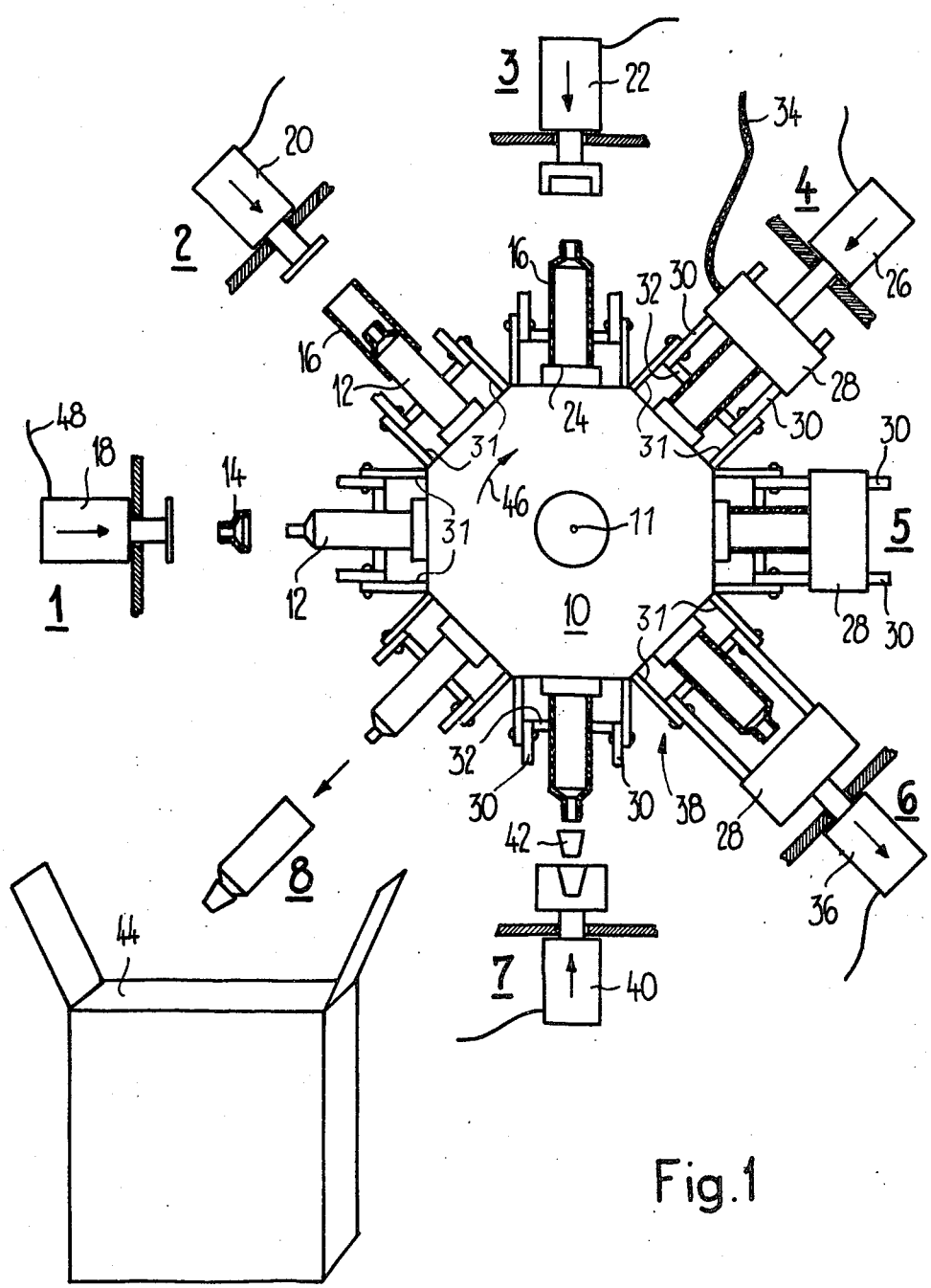
FIG. 1 is a schematic illustration of a rotary conveyor for the production of a tubular package showing the plurality of work stations.

Referring now to the drawings, there is shown in FIG. 1 a schematic illustration of a rotary conveyor 10 disposed to rotate in a horizontal plane about vertical axis 11. The table 10 conveys a plurality of mandrils 12 through eight work stations which, in this embodiment, correspond to the manufacturing steps involved in producing a tubular container.

The table 10 has the mandrils 12 evenly spaced apart thereon to extend radially from the periphery of the table 10.

At work station 1, each mandril 12 will receive from a supply (not shown) a tube head 14 in such a position that the piston and cylinder device 18 will operate to push the tube head 14 onto the end of a mandril 12. At work station 2, a similar device 20 will force a cylindrical tube body 16 supplied from a source (not shown) over the tube head 14 onto the body of the mandril 12 located at work station 2. At work station 3, a device 22 operates to push the tube 16 along the mandril 12 until it abuts a stop surface 24.

At work station 4, according to the present invention, there is illustrated in FIG. 1 a working means in the form of a mold member 28 mounted on spaced arms 30 which, in turn, are pivotally secured on arms 31 which extend from the periphery of table 10. A similar arrangement is provided for each of the mandrils 12 but only those elements at work stations 4, 5 and 6 are illustrated for purposes of clarity. The legs 30 are connected by a stirrup 32 and the mold member 28 is slidable on the legs 30 towards and away from the adjacent mandril 12. In this embodiment, the working means in the form of mold member 28 may include a welding tool (FIG. 2) which is powered by current supplied through conduit 34.

As will be described later in more detail, after the pivoting movement of mold member 28, at work station 4, a piston and cylinder device 26 is employed to shift the mold member 28 into engagement with the end of the mandril where the welding tool will seal the tube head 14 to the end of tube body 16. At work station 5 the mold member will remain in engagement with the end of the mandril while the cooling of the welded parts of the tube head 14 and tube body 16 take place. To hold the mold member 28 in the engaged position, a clamp or latch mechanism may be provided.

At work station 6, a piston and cylinder arrangement are employed to release the latch or clamping mechanism (not shown) whereby a spring will effect axial shifting of the mold member 28 along the legs 30 away from the end of mandril 12.

As the mandril is moved to work station 7, the mold member 28 will pivot on arms 30 about axis 38 to its non-working position. At work station 7, a device 40 is employed to screw a closing cup 42 supplied from a source not shown onto the end of the tube head 14. At station 8, the tube which is ready for the reception of filling material is ejected into a container 44. The discharging of the tube from the associated mandril 12 may be effected by any conventional means such as compressed air or an hydraulically actuated lever.

As will be apparent to those skilled in this art, the rotary table 10 is actuated by a driving mechanism, not shown, in the direction of arrow 46 whereby the length of a step corresponds to the angle between two adjacent stations. Thus, each of the mandrils 12 is opposite a work station after the rotary table 10 moves through one step. The dwell time for such arrangements may be as short as one second for the illustrated manufacturing process. Further, it will be understood that the working tools 18 through 40 are all fixed in position relative to the respective work stations and each may be operated by an hydraulic fluid or compressed air fed through the respective lines 48.

As previously mentioned, each of the eight mandrils 12 have associated therewith a working means in the form of a mold member 28. Between work stations 3 and 4, as the rotary table 10 rotates, mold member 28 moving between these work stations is moved from its non-working position to its working position as described in more detail below. As the table 10 rotates between stations 6 and 7, the mold member 28 located between these stations is moved from its working position back to its non-working position where it will remain until it moves again around to the point between stations 3 and 4.

Figure 2:
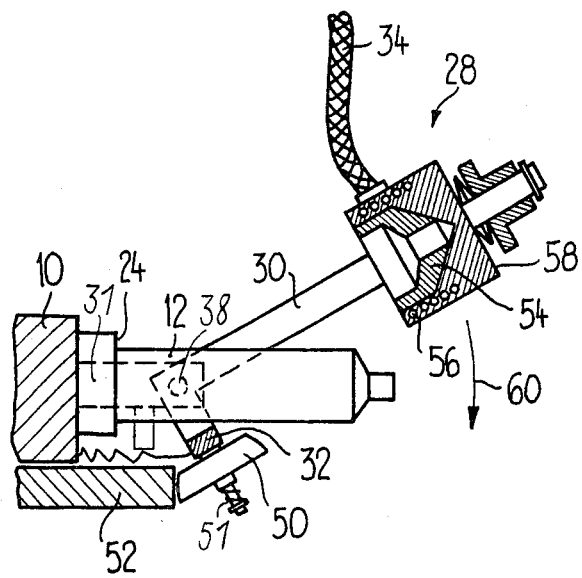
FIG. 2 is a side view, partly in section, showing the disposition of a working tool in its nonworking position.
Figure 3:
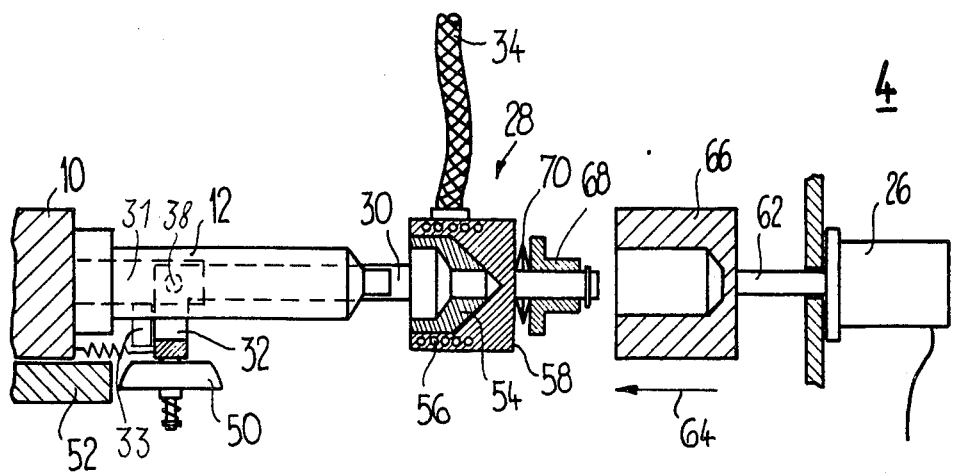
FIG. 3 is an illustration of the working tool of FIG. 2 in its working position at work station 4 of FIG. 1.

Referring now to FIGS. 2 and 3, there is illustrated a side sectional view of the mounting means for the mold member 28 according to the present invention. In FIG. 2, the mold member 28 and the welding tool 56 are shown in their non-working or rest position. These elements are maintained in this position by a cam disc 52 which is fixed about axis 11 and a cam follower in the form of a roller 50 which is mounted to be rotatable on a shaft extending from the stirrup 32. The periphery of the roller 50 is slanted towards its axis of rotation as shown in FIGS. 2 and 3 to provide a larger area of contact with the periphery of the cam disc 52 when the mold member 28 is in its non-working position as shown in FIG. 2. A spring 51 urges the roller along its support shaft to maintain the edge of the roller in contact with the periphery of the cam disc 52. The pivot axis 38 is located so that it passes through the central longitudinal axis of the mandril 12 and the roller 50 is located at the midpoint of the stirrup 32 between the arms 30 to ensure accurate positioning of the mold member 28 relative to the mandril 12 when the roller 50 passes over the recessed portions of the cam disc 52 between work stations 3 and 4.

The mold member 28 is preferably a matrix 54 of ceramic material which is shaped to closely overlie the tube head 14 on the end of mandril 12. A high frequency coil 56 may be embedded in a separate housing 58 which is fitted on the exterior of the ceramic matrix 54 or it may be embedded in the ceramic material itself.

With the table 10 rotating in a horizontal plane, as previously noted, in the direction of arrow 46, the mounting means of the mold member 28 will pivot downwardly in the direction of arrow 60 as it is moved between work stations 3 and 4 by virtue of the fact that the radius of the cam disc 52 is decreased between work stations 3 and 4. In the position of FIG. 3, the roller 50 will be out of contact with the periphery of the cam disc 52. Further pivoting of the arms 30 about the pivot axis 38 may be prevented by a stop member such as a projection 33 extending from one or both of the arms 31. Suitable spring means may be employed to press the stirrup 32 against the stop 33 to ensure precise alignment of the mold member 38 with the axis of the mandril 12.

Upon completion of the rotation of table 10 from work station 3 to work station 4, as shown in FIG. 3, the mold member 28 is moved along legs 30 in the direction of arrow 64 onto the end of mandril 12 by a drive member 66 actuated by a piston rod 62 which has one end in the cylinder 26. in a preferred embodiment, a clamping element is mounted slidably on the legs 30 which when shifted in the direction of arrow 64 grips the legs 30 to hold the mold member 28 in place when the driver 66 is retracted. A spring 70 is located between the exterior end of the housing 58 of the mold member 28 and the underside of the clamping element 68 to urge the housing 58 towards the end of the mandril 12. In an alternate arrangement, the edges of the legs 30 may be serrated to ensure firm positioning of the mold member 28 in its working position relative to the mandril 12.

As will be understood by those skilled in this art, circuit controls will be provided which are actuated to supply power through conduit 34 to the high frequency coils 56 when each coil is in the position of work station 4. However, according to the present invention, the length of the welding time is not limited by the time the particular mold member and welding tool are at work station 4 since, if necessary, current can be supplied to the high frequency coils 56 as the coils are moved from work station 4 to work station 5 or even longer, if desired. Circuit controls actuated by the table position can be employed to control the current to these coils, as is well known in the art.

Figure 4:
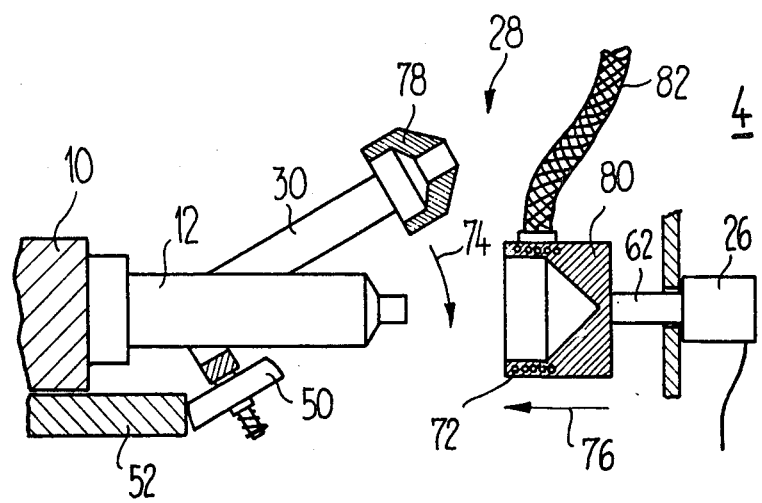
FIG. 4 is a variant of the working tool in its nonworking position.

In FIG. 4, another variant of the mold member 28 is shown where the welding operation is carried out only at work station 4. In such an arrangement, the clamping element 68 and spring 70 are also employed but have been omitted for clarity. In this embodiment the high frequency coil 72 is embedded in a housing 80 which is mounted on the end of piston rod 62 in place of the driver 66 of the previous embodiment. Current to the coil 72 is provided through a line 82. In operation, after the mandril 12 moves into work station 4 and the ceramic matrix mold 78 is pivoted downwardly in the direction of arrow 74 as in the previous embodiment, actuation of the piston rod effects the pushing of the ceramic matrix 78 onto the end of the mandril 12 and the welding is effected but only for the period of the dwell time in work station 4.

The cooling of the welded parts will be completed in work station 5 with the ceramic mold maintained in place to prevent undesirable deformation of the welded parts due to flowing of the still plastic parts prior to the hardening of the parts.

It will be understood, from the foregoing, that the axis of rotation of rotary table 10 may be vertical as well as horizontal and it is also within the scope of the present invention to provide a plurality of such tables on a single axis all of which move in synchronization with each other. It will also be apparent that by the appropriate selection of the shape of the cam disc 52, the movement of the mold member 28 may be from a vertically lower position to an upper position, where the lower position corresponds to the non-working position. In this arrangement, as well as others that will occur to those skilled in this art, the cam disc pressure on the rollers 50 may be employed to maintain the mold member 28 in its operating or working position and spring means employed, such as between the roller or stirrup to move the arms 30 and mold member 28 to its non-working position.

It will be appreciated by those skilled in the art, that while the invention has been described in connection with the production of a workpiece in the form of tubular container made entirely of preformed portions or parts, both being at least partially made up of a thermoplastic material, the invention permits equally well the production of such containers, where only for instance the tube body is a preformed part and the tube head is formed and attached to the tube body by a known injection molding process.

Having described the invention, it will be apparent that various other modifications may be made thereto without departing from the spirit and scope of the present invention as defined in the appended claims.

What is claimed is:

1. Apparatus for the production of a work piece including a plurality of mandrils each mounted in spaced relation to one another on a rotary member, said rotary member being mounted for rotation about an axis to move each mandril through a plurality of work stations, the improvement comprising:

said rotary member having working means mounted thereon adjacent each said mandril for performing a production step, each said working means being movable relative to said rotary member between a working and non-working position in response to rotation of said rotary member.

2. The apparatus as claimed in claim 1 wherein said working means comprises a mold member.

3. The apparatus as claimed in claim 2 wherein said rotary member has mounting means for mounting said mold member for movement between said working and non-working positions, said mounting means including a pair of spaced arms on which said mold member is movable towards and away from said rotary member, said spaced arms being pivotable about an axis to bring said mold member into juxtaposition with a work piece mounted on said adjacent mandril.

4. The apparatus as claimed in claim 3 wherein said rotary member includes a fixed cam surface and each said mounting means includes a cam follower.

5. The apparatus as claimed in claim 4 wherein said cam surface is recessed with respect to said rotary member to effect movement of said mounting means from said non-working to said working position as said rotary member moves through a selected number of said work stations.

6. The apparatus as claimed in claim 5 wherein said rotary member rotates in a plane and said pivot axis of each of said mounting means lies in said plane, said cam surface being disengaged from each said cam follower when said mounting means is in said working position.

7. The apparatus as claimed in claim 4 wherein said arms include a stirrup on which said cam follower is mounted, said cam follower comprising a roller mounted on a shaft fixed to said stirrup and a spring urging said roller against said cam surface when said arms are in said non-working position.

8. The apparatus as claimed in claim 3 wherein at one of said work stations, means are provided for moving a said mold member on said arms at said work station towards said mandril located at said work station and at another work station, means are provided for moving a said mold member away from a said mandril at said other work station.

9. The apparatus as claimed in claim 3 wherein spring means are provided for urging said mold member towards said mandril on said arms.

10. The apparatus as claimed in claim 2 wherein said mold member includes a welding tool for uniting by welding one portion of a work piece with a second portion thereof seated on a common mandril with the one portion.

11. The apparatus as claimed in claim 10 wherein said welding tool includes high frequency heating elements in said mold member.

12. The apparatus as claimed in claim 11 wherein said mold member is made from a ceramic material in which high frequency coils are embedded to surround a mold space.

13. The apparatus as claimed in claim 1 wherein said mandrils are disposed to extend radially of said rotary member.

* * * * *